(12) United States Patent
Murayama et al.

(10) Patent No.: US 8,458,454 B2
(45) Date of Patent: Jun. 4, 2013

(54) CONDITIONAL ACCESS APPARATUS

(75) Inventors: Shu Murayama, Tokyo (JP); Masahiro Abukawa, Tokyo (JP); Nobuyoshi Okumura, Tokyo (JP); Kenji Sakata, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 446 days.

(21) Appl. No.: 12/674,817

(22) PCT Filed: Aug. 24, 2007

(86) PCT No.: PCT/JP2007/066473
§ 371 (c)(1),
(2), (4) Date: Feb. 23, 2010

(87) PCT Pub. No.: WO2009/028026
PCT Pub. Date: Mar. 5, 2009

(65) Prior Publication Data
US 2011/0060911 A1    Mar. 10, 2011

(51) Int. Cl.
*H04L 29/06* (2006.01)
(52) U.S. Cl.
USPC .............................. 713/154; 726/27; 380/202
(58) Field of Classification Search
USPC .............................. 713/154; 726/27; 380/202
See application file for complete search history.

(56) References Cited

U.S. PATENT DOCUMENTS

| | | | |
|---|---|---|---|
| 6,373,904 B1 * | 4/2002 | Sakamoto et al. | 375/316 |
| 6,912,513 B1 * | 6/2005 | Candelore | 705/51 |
| 7,567,674 B2 * | 7/2009 | Nishimoto et al. | 380/281 |
| 2002/0188567 A1 * | 12/2002 | Candelore | 705/51 |
| 2003/0084291 A1 * | 5/2003 | Yamamoto et al. | 713/168 |
| 2004/0257470 A1 * | 12/2004 | Leyendecker et al. | 348/552 |
| 2005/0071866 A1 * | 3/2005 | Louzir et al. | 725/31 |
| 2005/0210500 A1 * | 9/2005 | Stone | 725/31 |
| 2005/0216763 A1 * | 9/2005 | Lee et al. | 713/200 |
| 2006/0033840 A1 * | 2/2006 | Diehl et al. | 348/468 |
| 2006/0141988 A1 * | 6/2006 | Wendling | 455/412.1 |
| 2006/0212399 A1 * | 9/2006 | Akiyama | 705/50 |
| 2007/0061875 A1 * | 3/2007 | Le Buhan et al. | 726/10 |
| 2007/0073945 A1 * | 3/2007 | Barry et al. | 710/72 |

(Continued)

FOREIGN PATENT DOCUMENTS

| | | | |
|---|---|---|---|
| JP | 2000-115091 A | 4/2000 | |
| JP | 2001-298722 A | 10/2001 | |

(Continued)

OTHER PUBLICATIONS

"Functional Model of a Conditional Access System", 8301 EBU Review Technical (1995) Winter, No. 266, pp. 64-77, Dec. 21, 1995, XP000559450.

*Primary Examiner* — Michael Pyzocha
(74) *Attorney, Agent, or Firm* — Birch, Stewart, Kolasch & Birch, LLP

(57) ABSTRACT

A conditional access apparatus receives a filter condition from another conditional access apparatus to set the filter condition to a filter unit 1 thereof. When key information meeting the above-mentioned filter condition is outputted from the filter unit 1, the conditional access apparatus informs the key information to the other conditional access apparatus, and also informs the filter condition set to the filter unit 1 by the key information control unit 3 to the other conditional access apparatus and acquires key information meeting the above-mentioned filter condition from the other conditional access apparatus.

7 Claims, 9 Drawing Sheets

U.S. PATENT DOCUMENTS

| | | | |
|---|---|---|---|
| 2007/0124245 A1* | 5/2007 | Sato et al. | 705/50 |
| 2007/0198434 A1* | 8/2007 | Jang et al. | 705/67 |
| 2008/0010457 A1* | 1/2008 | Lee et al. | 713/169 |
| 2008/0065548 A1* | 3/2008 | Muijen | 705/51 |
| 2008/0082445 A1* | 4/2008 | Watanabe et al. | 705/51 |

FOREIGN PATENT DOCUMENTS

| | | |
|---|---|---|
| JP | 2007-129575 A | 5/2007 |
| WO | WO-2005/096157 A1 | 10/2005 |
| WO | WO 2007/059377 A2 | 5/2007 |

* cited by examiner

CONDITIONAL ACCESS APPARATUS

FIELD OF THE INVENTION

The present invention relates to a conditional access apparatus that receives encrypted media data (e.g., video, audio, and other data) and key information which the conditional access apparatus uses when decrypting the media data.

BACKGROUND OF THE INVENTION

As a conventional conditional access apparatus, a receiver for digital broadcasting is mentioned, for example.

An encryption method for use in digital broadcasting in Japan is defined by the technical specification "ARIB STD-B25" regarding a content protection method of ARIB (Association of Radio Industries and Businesses).

In this technical specification, it is defined that media data and common information (ECM: Entitlement Control Message) which are encrypted are transmitted from a broadcasting station to receivers, and individual information (EMM: Entitlement Management Message) which is used when decrypting the encrypted common information is also transmitted from the broadcasting station to receivers after being encrypted.

Therefore, receivers cannot decrypt the encrypted media data until they receive the common information ECM and the individual information EMM from the broadcasting station.

FIG. 9 is an explanatory drawing showing an exchange of information between a broadcasting station and a receiver which is defined in the technical specification "ARIB STD-B25".

When a program content (e.g., media data such as video and audio) is transmitted from the broadcasting station to the receiver, the program content is encrypted by using a scramble key Ks.

This scramble key Ks is encrypted by using another work key Kw, and the encrypted scramble key Ks is transmitted to the receiver as common information ECM which is a part of control data.

Furthermore, the work key Kw is encrypted by using another device key Kd, and the encrypted work key Kw is transmitted to the receiver as individual information EMM which is a part of the control data.

As mentioned above, the program content, the common information ECM, and the individual information EMM are transmitted from the broadcasting station to the receiver while the device key Kd is held in common by the broadcasting station and the receiver.

The receiver decrypts the desired media data encrypted by receiving the common information ECM and the individual information EMM from the broadcasting station first, acquiring the work key Kw from the individual information EMM by using the device key Kd which the receiver itself holds, and further acquiring the scramble key Ks from the common information ECM by using the work key Kw.

A filter condition for acquiring the common information ECM from the stream is common to all the receivers. For example, the filter condition is a packet ID, a table ID, or the like.

On the other hand, a filter condition for acquiring the individual information EMM from the stream is set for viewing and listening in such a way that the filter condition is changed for each specific receiver or each receiver of a specific group. For example, the filter condition is the card ID of an IC card, the identification information of a receiver, or the like.

Therefore, by simply transmitting the individual information EMM meeting only a filter condition which is set for viewing and listening in some receivers, the broadcasting station makes it possible to provide a program content which users can view and listen to in only some receivers.

The broadcasting station transmits the individual information EMM to the receivers periodically, and, when the types of individual information EMM increase, there is generally a tendency for the retransmission cycle of each individual information EMM to become long.

In each receiver, when the retransmission cycle of each individual information EMM becomes long, the length of time required to acquire the individual information EMM meeting the filter condition set up beforehand becomes long, and therefore it takes much time to acquire the work key Kw.

Therefore, the broadcasting station which is the sending source of each individual information EMM generally transmits each individual information EMM at a sufficiently preceding time. However, when, for example, the receiver is not turned on, the receiver cannot receive each individual information EMM in advance to acquire the work key Kw.

Furthermore, in order to enable the receiver to acquire the work key Kw in advance, there can be considered a method of making the receiver always operate or starting the receiver at regular intervals also when the user is not viewing and listening to a program content. However, in a case in which, for example, the receiver is mounted in a vehicle, the electric power which the receiver can use has a limitation, and there may be a case in which the receiver cannot receive radio waves satisfactorily depending on a place where the vehicle is stationary. Therefore, the above-mentioned method is not in practical.

In the following patent reference 1, a method of providing each of a plurality of home-use conditional access apparatuses each of which requires identical individual information EMM with a communications means, and, when one of the conditional access apparatuses receives the individual information EMM, informing the individual information EMM to the other conditional access apparatuses to enable the conditional access apparatuses to complement one another is disclosed.

However, each of these conditional access apparatuses is based on the premise that these conditional access apparatuses belong the same group in the home, for example, and they can complement one another to share the individual information EMM which each conditional access apparatus has acquired with the same filter condition, but cannot complement with any other conditional access apparatus having a different filter condition.

Furthermore, because the individual information EMM is encrypted typically by using another key, it is necessary to decrypt the encrypted individual information EMM as occasion demands in order for the conditional access apparatuses to complement one another to share the individual information EMM.

[Patent reference 1] JP, 2001-298722, A (see paragraphs having numbers [0026] and [0027], and FIG. 1)

Because the conventional conditional access apparatus is configured as mentioned above, a problem is that when a filter condition set to the conditional access apparatus differs from that set to another conditional access apparatus, the conditional access apparatus cannot acquire individual information EMM beforehand from the other conditional access apparatus, and therefore cannot acquire a work key Kw until the individual information EMM is transmitted thereto from a broadcasting station.

The present invention is made in order to solve the above-mentioned problem, and it is therefore an object of the present invention to provide a conditional access apparatus that can provide key information in advance to another conditional access apparatus even when a filter condition set to the conditional access apparatus differs from that set to the other conditional access apparatus.

It is another object of the present invention to provide a conditional access apparatus that can acquire key information from another conditional access apparatus beforehand even when a filter condition set to the conditional access apparatus differs from that set to the other conditional access apparatus.

DISCLOSURE OF THE INVENTION

A conditional access apparatus in accordance with the present invention includes: a key information informing means for receiving a filter condition from another conditional access apparatus to set the received filter condition to a filtering means, and for, when key information meeting the above-mentioned filter condition is outputted from the filtering means, informing the key information to the other conditional access apparatus; and a key information acquiring means for informing the filter condition set to the filtering means the key information decrypting means to the other conditional access apparatus, and for acquiring key information meeting the above-mentioned filter condition from the other conditional access apparatus.

Therefore, there is provided, for example, an advantage of being able to acquire the key information from the other conditional access apparatus even when the filter condition set to the filtering means differs from the filter condition set to the other conditional access apparatus.

There is provided another advantage of being able to provide the key information to the other conditional access apparatus in advance even when the filter condition set to the filtering means differs from the filter condition set to the other conditional access apparatus.

PREFERRED EMBODIMENTS OF THE INVENTION

Hereafter, in order to explain this invention in greater detail, the preferred embodiments of the present invention will be described with reference to the accompanying drawings.

Embodiment 1

Figure 1:
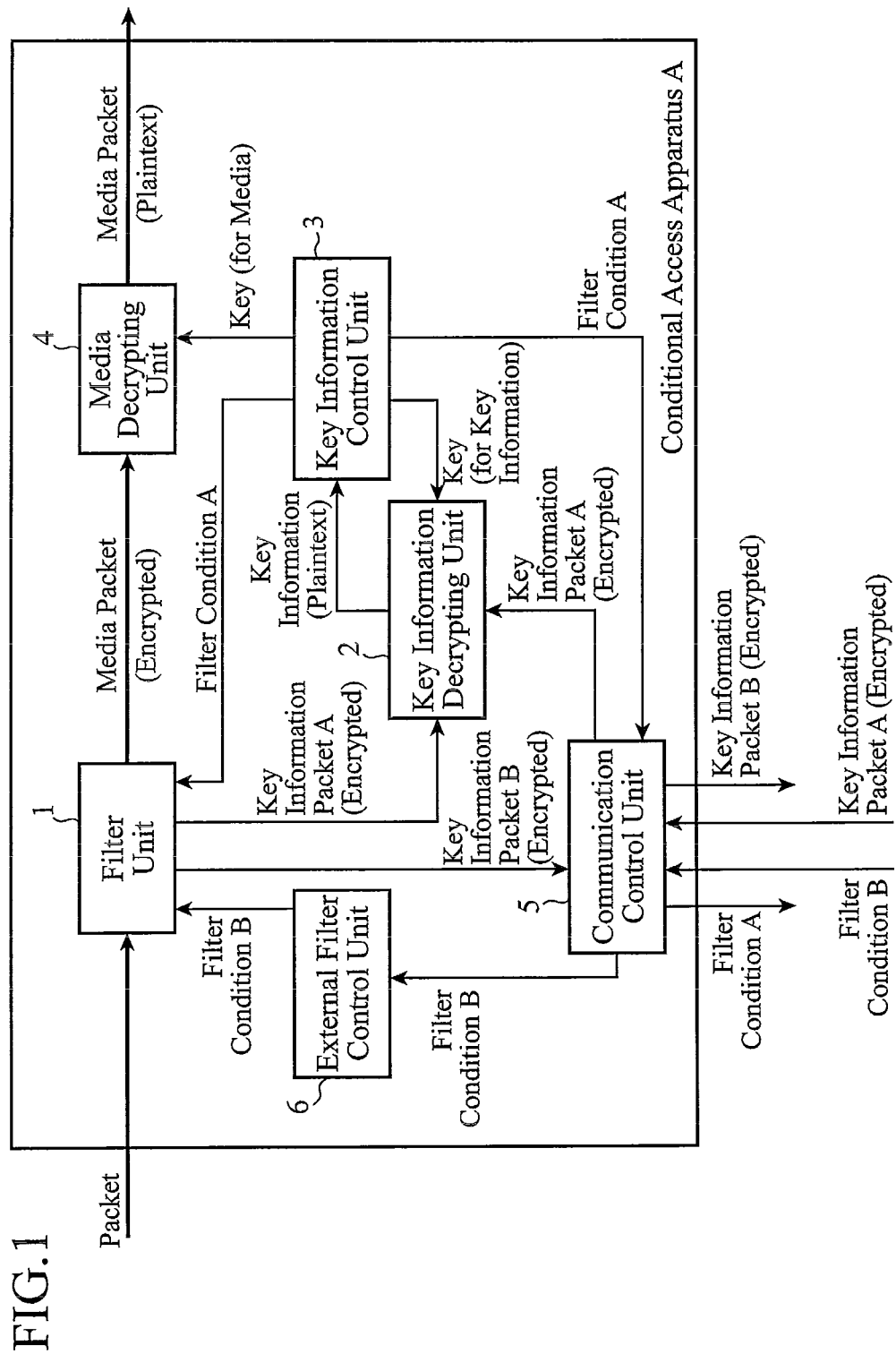
FIG. 1 is a block diagram showing a conditional access apparatus in accordance with Embodiment 1 of the present invention.

FIG. 1 is a block diagram showing a conditional access apparatus in accordance with Embodiment 1 of the present invention.

In this Embodiment 1, for the sake of simplicity, it is assumed that two conditional access apparatuses A and B exchange filter conditions and key information packets between each other. FIG. 1 shows the configuration of the conditional access apparatus A. The conditional access apparatus B has the same configuration as that of the conditional access apparatus A.

In FIG. 1, a filter unit 1 of the conditional access apparatus A receives a packet transmitted from a broadcasting station, and, when the received packet is a media packet including encrypted media data (e.g., video, audio, other data), outputs the media packet to a media decrypting unit 4. When the received packet is a key information packet meeting a filter condition A set up by a key information control unit 3 (for example, in a case in which the filter condition A is used for acquiring a work key Kw which is individual information EMM, the card ID of an IC card mounted in the conditional access apparatus A, identification information of the conditional access apparatus A, or the like is provided as the filter condition A, and in a case in which the filter condition A is used for acquiring a scramble key Ks which is common information ECM, a packet ID, a table ID, or the like is provided as the filter condition A), the filter unit carries out a process of outputting the key information packet to a key information decrypting unit 2. The filter unit 1 forms a filtering means.

The key information decrypting unit 2 of the conditional access apparatus A decrypts the work key Kw which is an encryption key included in the key information packet outputted from the filter unit 1 (decodes the encryption) by using a plaintext device key Kd (a key for key information) held by the key information control unit 3, and also decrypts the scramble key Ks which is an encryption key included in the key information packet by using the plaintext work key Kw (decodes the encryption) and carries out a process of outputting the plaintext scramble key Ks (a key for media) to the key information control unit 3.

In this example, the encryption keys included in the key information packet are the work key Kw and the scramble key Ks which are periodically changed from the viewpoint of prevention of information leakage. As an alternative, other encryption keys can be included in the key information packet and then transmitted from the broadcasting station.

The key information control unit 3 of the conditional access apparatus A holds the plaintext device key Kd and the filter condition A beforehand, and outputs the device key Kd to the key information decrypting unit 2 and also carries out a process of setting the filter condition A to the filter unit 1. The key information control unit also carries out a process of outputting the plaintext scramble key Ks decrypted by the key information decrypting unit 2 to the media decrypting 4, and also outputting the filter condition A to a communication control unit 5.

The key information decrypting unit 2 and the key information control unit 3 form a key information decrypting means.

The media decrypting unit 4 of the conditional access apparatus A carries out a process of decrypting media packets outputted from the filter unit 1 in units of one packet by using the scramble key Ks outputted from the key information control unit 3 (decoding the encryption), and outputting the plaintext media packets. The media decrypting unit 4 forms a media data decrypting means.

The communication control units 5 of the conditional access apparatus A is communication equipment which carries out information exchange with the conditional access apparatus B (the other conditional access apparatus), and, when the communication control unit 5 receives a filter condition B (for example, in a case in which the filter condition B is used for acquiring a work key Kw which is individual information EMM, the card ID of an IC card mounted in the conditional access apparatus B, identification information of the conditional access apparatus B, or the like is provided as the filter condition B, and in a case in which the filter condition B is used for acquiring a scramble key Ks which is common information ECM, a packet ID, a table ID, or the like is provided as the filter condition B) transmitted from the conditional access apparatus B, carries out a process of outputting the filter condition B to an external filter control unit 6, and transmitting the filter condition A outputted from the key information control unit 3 to the conditional access apparatus B.

When receiving a key information packet B (for example, including a work key Kw and a scramble key Ks) which meets the filter condition B from the filter unit 1, the communication control unit 5 carries out a process of transmitting the key information packet B to the conditional access apparatus B. In contrast, when receiving a key information packet A (for example, including a work key Kw and a scramble key Ks) which meets the filter condition A from the conditional access apparatus B, the communication control unit carries out a process of outputting the key information packet A to the key information decrypting unit 2.

The external filter control unit 6 of the conditional access apparatus A carries out a process of setting the filter condition B outputted from the communication control unit 5 to the filter unit 1.

The communication control unit 5 and the external filter control unit 6 form a key information informing means.

The communication control unit 5 forms a key information acquiring means.

Figure 2:
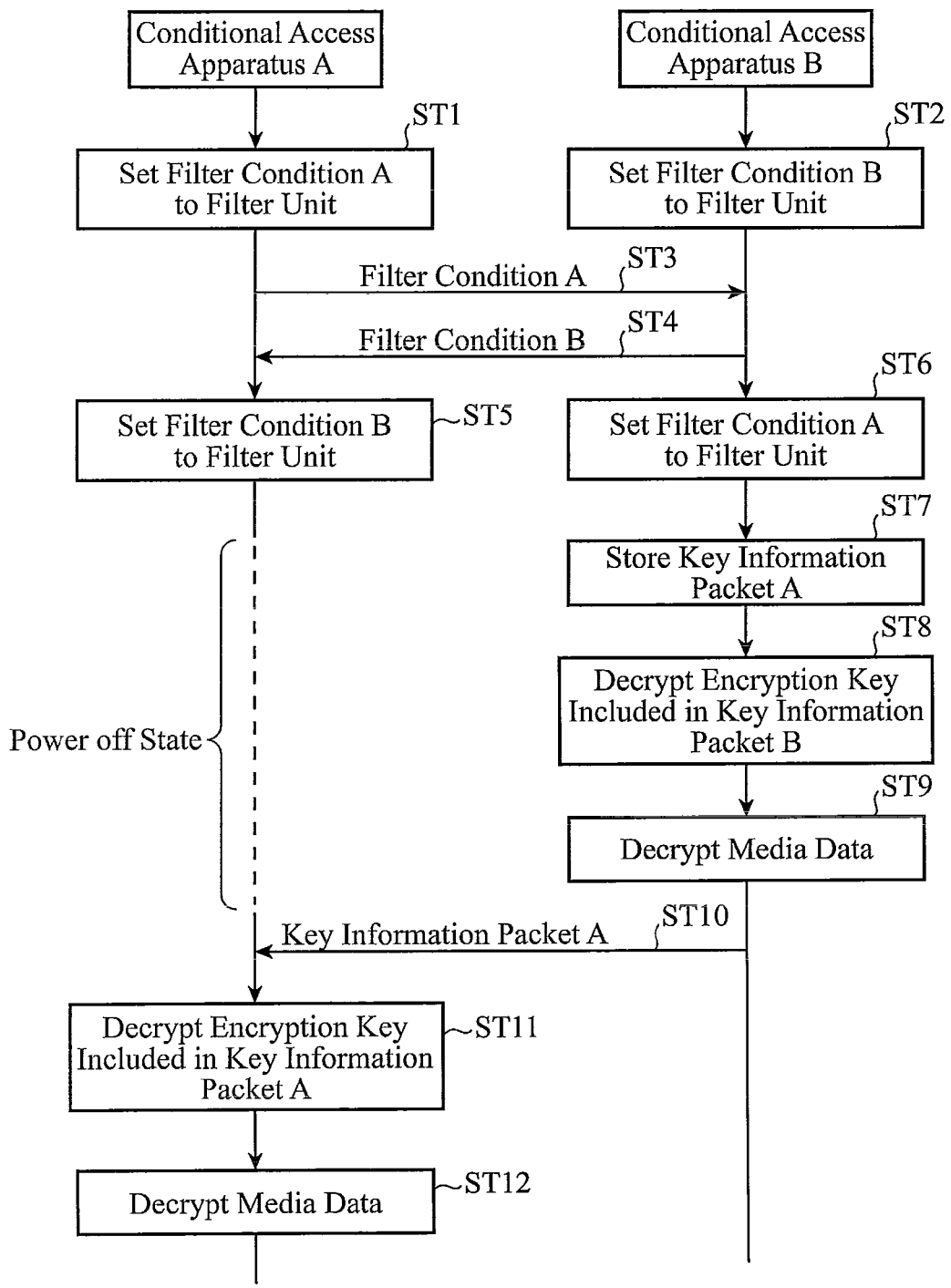
FIG. 2 is a flow chart showing processes respectively carried out by conditional access apparatuses A and B in accordance with Embodiment 1 of the present invention.

FIG. 2 is a flow chart showing processes respectively carried out by the conditional access apparatuses A and B in accordance with Embodiment 1 of the present invention.

Next, the operations of the conditional access apparatuses will be explained.

The key information control unit 3 of the conditional access apparatus A holds its device key Kd and its filter condition A beforehand and outputs the device key Kd to the key information decrypting unit 2, and also sets the filter condition A to the filter unit 1 (step ST1).

The key information control unit 3 of the conditional access apparatus A further outputs the filter condition A to the communication control unit 5.

On the other hand, the key information control unit 3 of the conditional access apparatus B holds its device key Kd and its filter condition B beforehand and outputs the device key Kd to the key information decrypting unit 2, and also sets the filter condition B to the filter unit 1 (step ST2).

The key information control unit 3 of the conditional access apparatus B outputs the filter condition B to the communication control unit 5.

When receiving the filter condition A from the key information control unit 3, the communication control unit 5 of the conditional access apparatus A transmits the filter condition A to the conditional access apparatus B (step ST3).

When receiving the filter condition B from the key information control unit 3, the communication control unit 5 of the conditional access apparatus B transmits the filter condition B to the conditional access apparatus A (step ST4).

When receiving the filter condition B transmitted from the conditional access apparatus B, the communication control unit 5 of the conditional access apparatus A outputs the filter condition B to the external filter control unit 6.

When receiving the filter condition B from the communication control unit 5, the external filter control unit 6 of the conditional access apparatus A sets the filter condition B to the filter unit 1 (step ST5).

When receiving the filter condition A transmitted from the conditional access apparatus A, the communication control unit 5 of the conditional access apparatus B outputs the filter condition A to the external filter control unit 6.

When receiving the filter condition A from the communication control unit 5, the external filter control unit 6 of the conditional access apparatus B sets the filter condition A to the filter unit 1 (step ST6).

As a result, the conditional access apparatus A can acquire both the encryption keys required when decoding the encryption of the media packets destined therefor (i.e., the encryption keys meeting the filter condition A (the work key Kw and the scramble key Ks)), and the encryption keys which the conditional access apparatus B requires when decoding the encryption of the media packets (i.e., the key information packets meeting the filter condition B (including the work key Kw and the scramble key Ks)).

Furthermore, the conditional access apparatus B can acquire both the encryption keys required when decoding the encryption of the media packets destined therefor (i.e., the encryption keys meeting the filter condition B (the work key Kw and the scramble key Ks)), and the encryption keys which the conditional access apparatus A requires when decoding the encryption of the media packets (i.e., the key information packets meeting the filter condition A (including the work key Kw and the scramble key Ks)).

Hereafter, for the sake of simplicity, it is assumed that the power supply of the conditional access apparatus A is turned off, and the conditional access apparatus A cannot receive any packets temporarily.

For example, when the conditional access apparatus B receives a packet transmitted from the broadcasting station, if the received packet is a media packet including encrypted media data, the filter unit 1 of the conditional access apparatus B outputs the media packet to the media decrypting unit 4.

In contrast, if the received packet is a key information packet B meeting the filter condition B set up by the key information control unit 3, the filter unit 1 of the conditional access apparatus B outputs the key information packet B to the key information decrypting unit 2.

If the received packet is a key information packet A meeting the filter condition A (the filter condition A transmitted from the conditional access apparatus A) set up by the external file control unit 6, the filter unit 1 of the conditional access apparatus B outputs the key information packet A to the communication control unit 5.

When receiving the key information packet A from the filter unit 1, the communication control unit 5 of the conditional access apparatus B stores the key information packet A therein until the power supply of the conditional access apparatus A is turned on and the conditional access apparatus B becomes able to carry out communications with the conditional access apparatus A (step ST7).

When receiving the key information packet B from the filter unit 1, the key information decrypting unit 2 of the conditional access apparatus B decodes the encryption of the work key Kw which is an encryption key included in the key information packet B by using the plaintext device key Kd (a key for key information) held by the key information control unit 3.

The key information decrypting unit 2 also decodes the encryption of the scramble key Ks which is an encryption key included in the key information packet B by using the plaintext work key Kw, and outputs the plaintext scramble key Ks (a key for media) to the key information control unit 3 (step ST8).

When receiving the plaintext scramble key Ks from the key information decrypting unit 2, the key information control unit 3 of the conditional access apparatus B outputs the scramble key Ks to the media decrypting unit 4.

When receiving the scramble key Ks from the key information control unit 3, the media decrypting unit 4 of the conditional access apparatus B decrypts media packets outputted from the filter unit 1 in units of one packet by using the scramble key Ks, and outputs the decrypted plaintext media packets to a next-stage media decoding unit (not shown) and so on (step ST9).

When the media data included in the media packets are encoded data, media decoding of the media data and so on are carried out.

When the power supply of the conditional access apparatus A is turned on and the conditional access apparatus B becomes able to carry out communications with the conditional access apparatus A, the communication control unit 5 of the conditional access apparatus B transmits the key information packet A which the conditional access apparatus B previously stored therein to the conditional access apparatus A (step ST10).

When receiving the key information packet A transmitted from the conditional access apparatus B, the communication control unit 5 of the conditional access apparatus A outputs the key information packet A to the key information decrypting unit 2.

Because the communication control unit 5 of the conditional access apparatus B transmits the key information packet A to the conditional access apparatus A without decrypting the encryption key included in the key information packets A, i.e. with the encryption key being in a state in which it is encrypted, the privacy of the key information can be maintained and the leakage of the key information can be prevented.

Furthermore, because the amount of computations required for encryption and decryption of the key information can be reduced, the cost of hardware and software required for the implementation of the conditional access apparatus and the power consumption of the conditional access apparatus during operation can be reduced.

When receiving the key information packet A from the communication control unit 5, the key information decrypting unit 2 of the conditional access apparatus A decodes the encryption of the work key Kw which is an encryption key included in the key information packet A by using the plaintext device key Kd (a key for key information) held by the key information control unit 3.

The key information decrypting unit 2 also decodes the encryption of the scramble key Ks which is an encryption key included in the key information packet A by using the plaintext work key Kw, and outputs the plaintext scramble key Ks (a key for media) to the key information control unit 3 (step ST11).

When receiving the plaintext scramble key Ks from the key information decrypting unit 2, the key information control unit 3 of the conditional access apparatus A outputs the scramble key Ks to the media decrypting unit 4.

When receiving the scramble key Ks from the key information control unit 3, the media decrypting unit 4 of the conditional access apparatus A decrypts the media packets outputted from the filter unit 1 by using the scramble key Ks in units of one packet, and outputs the decrypted plaintext media packets to a next-stage media decoding unit (not shown) and so on (step ST12).

When the media data included in the media packets are encoded data, media decoding of the media data and so on are carried out.

In the example of FIG. 2, while the power supply of the conditional access apparatus A is turned off, the conditional access apparatus B acquires the key information packet A, and, when the power supply of the conditional access apparatus A is turned on and communications with the conditional access apparatus A becomes possible, promptly transmits the key information packet A to the conditional access apparatus A, so that even before the key information packet A is transmitted from the broadcasting station to the conditional access apparatus A, the conditional access apparatus A can start decrypting the media packets, as previously mentioned. In contrast with this, in a case in which the power supply of the conditional access apparatus B is turned off, while the power supply of the conditional access apparatus B is turned off, the conditional access apparatus A can acquire the key information packet B, and, when the power supply of the conditional access apparatus B is turned on and communications with the conditional access apparatus B becomes possible, can promptly transmit the key information packet B to the conditional access apparatus B.

Furthermore, in the example of FIG. 2, while the power supply of the conditional access apparatus A is turned off, the conditional access apparatus B acquires the key information packet A, as previously mentioned. There is, for example, a case in which even in a state in which the power supply of the conditional access apparatus A is turned on, the conditional access apparatus A may fail in acquisition of the key information packet A due to deterioration of the reception state, or the like.

As provision for such a case, the conditional access apparatus B can acquire the key information packet A constantly, and transmit the key information packet A to the conditional access apparatus A.

In the example of FIG. 2, the two conditional access apparatuses A and B exchange filter conditions and key information packets with each other, as previously mentioned. As an alternative, three or more conditional access apparatuses can exchange filter conditions and key information packets with one another.

In this case, each of the conditional access apparatuses needs to manage a filter condition and a key information packet which are set to any other conditional access apparatus in addition to a filter condition and a key information packet destined for itself.

As can be seen from the above description, the conditional access apparatus in accordance with this Embodiment 1 is configured in such a way as to receive a filter condition from another conditional access apparatus to set the filter condition to the filter unit 1 thereof, and, when key information meeting the above-mentioned filter condition is outputted from the filter unit 1, inform the key information to the other conditional access apparatus and also inform the filter condition set to the filter unit 1 by the key information control unit 3 to the other conditional access apparatus, and acquire key information meeting the above-mentioned filter condition from the other conditional access apparatus. Therefore, there is provided, for example, an advantage of being able to acquire the key information from the other conditional access apparatus in advance even when the filter condition set to the filter unit 1 differs from the filter condition set to the other conditional access apparatus.

There is provided another advantage of being able to provide the key information to the other conditional access apparatus in advance even when the filter condition set to the filter unit 1 differs from the filter condition set to the other conditional access apparatus.

As a result, the conditional access apparatus can start decrypting media packets promptly even when the cycle of the transmission of the key information from the broadcasting station is long and the conditional access apparatus cannot acquire the key information promptly from the broadcasting station. Therefore, there is provided a further advantage of being able to shorten the length of waiting time required to start decrypting media data and the length of waiting time required to start playing back the media data after the conditional access apparatus starts operating.

In this Embodiment 1, each of the conditional access apparatuses A and B has the function of informing the filter condition thereof to the other conditional access apparatus to receive a key information packet meeting the above-mentioned filter condition from the other conditional access apparatus (the function will be referred to as a "key information packet acquiring function" from here on), and the function of receiving a filter condition from the other conditional access apparatus to inform a key information packet meeting the filter condition to the other conditional access apparatus (the function is referred to as a "key information packet informing function" from here on), as previously mentioned. In a variant, the conditional access apparatus A can include only the key information packet acquiring function, and the conditional access apparatus B can include only the key information packet informing function.

In this variant, in the conditional access apparatus A, the external filter control unit 6 becomes unnecessary, and the function of the filter unit 1 outputting the key information packet B to the communication control unit 5 becomes unnecessary.

Furthermore, in the conditional access apparatus B, the function of the key information control unit 3 outputting the filter condition A to the communication control unit 5, and the function of the communication control unit 5 outputting the key information packet A to the key information decrypting unit 2 become unnecessary.

However, in this case, immediately after the power supply is switched on, the conditional access apparatus A can acquire the key information packet A from the conditional access apparatus B promptly and can start decrypting media packets, while the conditional access apparatus B cannot acquire the key information packet B from the conditional access apparatus A even after the power supply thereof is turned on.

Furthermore, in this Embodiment 1, digital broadcasting is explained as an example of the broadcasting, though this embodiment can be applied to satellite communications and other encrypted data communications.

In addition, when it is known that the conditional access apparatus is not the only one, the key information for the conditional access apparatus can be outputted to outside the conditional access apparatus because the key information can also become the one for an external conditional access apparatus.

Embodiment 2

Figure 3:
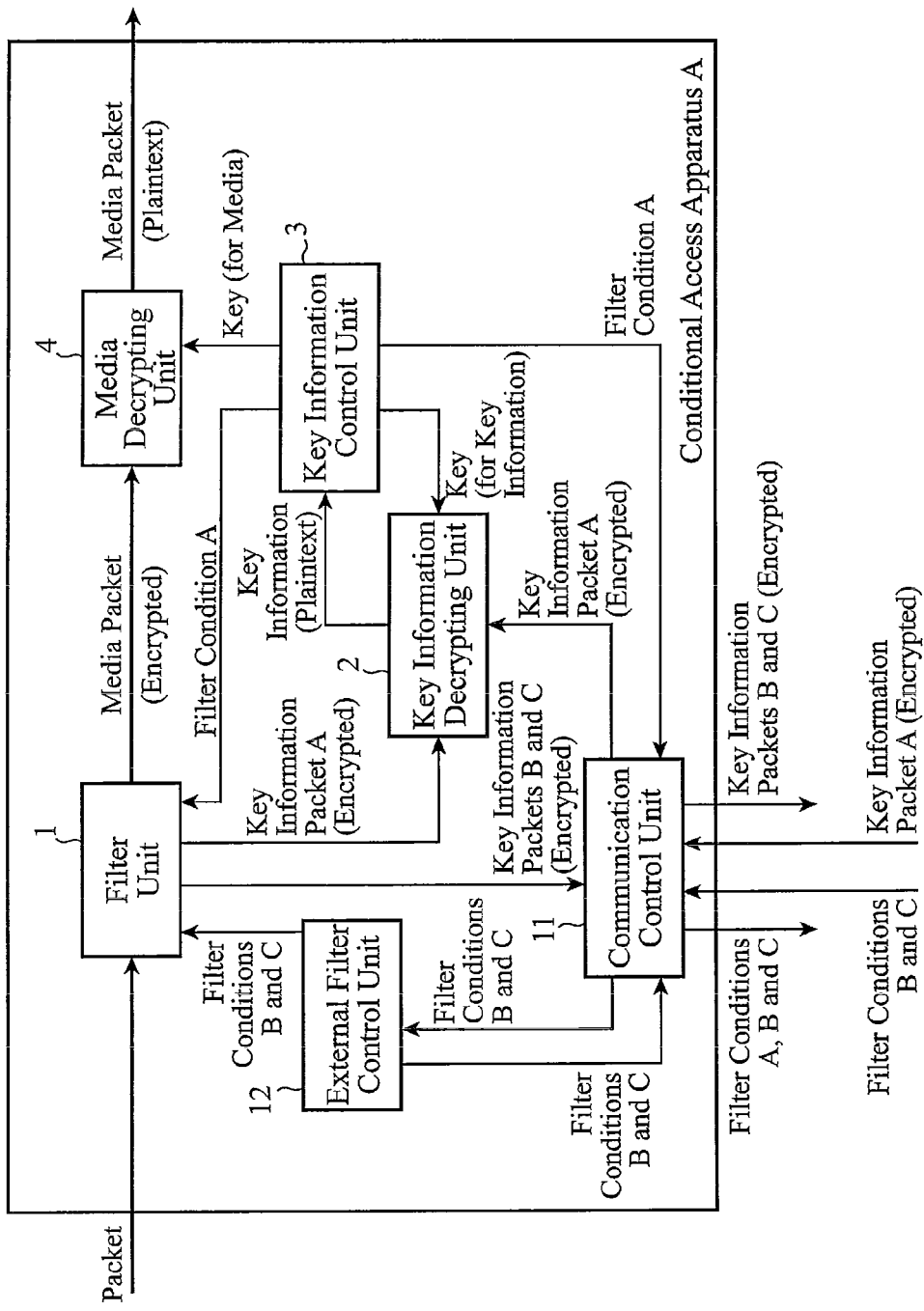
FIG. 3 is a block diagram showing a conditional access apparatus in accordance with Embodiment 2 of the present invention.

FIG. 3 is a block diagram showing a conditional access apparatus in accordance with Embodiment 2 of the present invention. In the figure, because the same reference numerals as those shown in FIG. 1 denote the same components or like components, the explanation of these components will be omitted hereafter.

In above-mentioned Embodiment 1, two conditional access apparatuses A and B exchange filter conditions and key information packets with each other, as previously mentioned. In contrast, in accordance with this Embodiment 2, an embodiment in which three conditional access apparatuses A, B, and C exchange filter conditions and key information packets with one another will be explained.

Hereafter, although the embodiment in which the three conditional access apparatuses A, B, and C exchange filter conditions and key information packets with one another will be explained, three or more conditional access apparatuses can exchange filter conditions and key information packets with one another.

A communication control unit 11 of the conditional access apparatus A carries out a process for, when receiving a filter condition C transmitted from the conditional access apparatus C, outputting the filter condition C to an external filter control unit 12, and transmitting a filter condition A outputted from a key information control unit 3 to the conditional access apparatus C, in addition to having the same function as that of the communication control unit 5 of FIG. 1.

The communication control unit 11 also carries out a process of transmitting a filter condition B transmitted from the conditional access apparatus B to the conditional access apparatus C, and also transmitting the filter condition C transmitted from the conditional access apparatus C to the conditional access apparatus B.

The communication control unit 11 further carries out a process of, when receiving a key information packet B meeting the filter condition B from a filter unit 1, transmitting the key information packet B to the conditional access apparatus B, and, when receiving a key information packet C meeting the filter condition C from the filter unit 1, transmitting the key information packet C to the conditional access apparatus C.

The external filter control unit 12 of the conditional access apparatus A carries out a process of setting the filter conditions B and C outputted from the communication control unit 11 to the filter unit 1, and also outputting the filter conditions B and C to the communication control unit 11.

The communication control unit 11 and the external filter control unit 12 form a key information informing means.

The communication control unit 11 forms a key information acquiring means.

Next, the operations of the conditional access apparatuses will be explained.

In this Embodiment 2, for the sake of simplicity, an explanation will be made assuming that the conditional access apparatuses A and B exchange filter conditions and key information packets with each other, like in the case of above-mentioned Embodiment 1, and the conditional access apparatus C which has been in a shutdown state enters a state in which the conditional access apparatus C can carry out communications with only the conditional access apparatus A after the conditional access apparatuses A and B start decrypting media packets.

A communication control unit 11 of the conditional access apparatus C transmits its filter condition C to the conditional access apparatus A when communications with the conditional access apparatus A becomes possible.

When receiving the filter condition C transmitted from the conditional access apparatus C, the communication control unit 11 of the conditional access apparatus A outputs the filter condition C to the external filter control unit 12.

When receiving the filter condition C from the communication control unit 11, the external filter control unit 12 of the conditional access apparatus A sets the filter condition C to the filter unit 1.

Because the filter conditions A and B are already set to the filter unit 1, the filter conditions A, B, and C have been set to the filter unit in all.

After setting the filter condition C to the filter unit 1, the external filter control unit 12 of the conditional access apparatus A outputs the filter condition B which is already set to the filter unit 1 to the communication control unit 11.

The communication control unit 11 of the conditional access apparatus A transmits both the filter condition B outputted from the external filter control unit 12, and the filter condition A outputted from the key information control unit 3 to the conditional access apparatus C.

When receiving the filter conditions A and B transmitted from the conditional access apparatus A, the communication control unit 11 of the conditional access apparatus C outputs the filter conditions A and B to the external filter control unit 12.

When receiving the filter conditions A and B from the communication control unit 11, the external filter control unit 12 of the conditional access apparatus C sets the filter conditions A and B to the filter unit 1.

Because the filter condition C is also set to the filter unit 1 of the conditional access apparatus C by the key information control unit 3, the filter conditions A, B, and C have been set to the filter unit in all.

After setting the filter condition C to the filter unit 1, the external filter control unit 12 of the conditional access apparatus A outputs the filter condition C to the communication control unit 11.

When receiving the filter condition C from the external filter control unit 12, the communication control unit 11 of the conditional access apparatus A transmits the filter condition C to the conditional access apparatus B.

When receiving the filter condition C transmitted from the conditional access apparatus A, the communication control unit 11 of the conditional access apparatus B outputs the filter condition C to the external filter control unit 12.

When receiving the filter condition C from the communication control unit 11, the external filter control unit 12 of the conditional access apparatus B sets the filter condition C to the filter unit 1.

Because the filter conditions A and B are already set to the filter unit 1 of the conditional access apparatus B, the filter conditions A, B, and C have been set to the filter unit in all.

As a result, the conditional access apparatuses A, B, and C become able to acquire key information packets A, B, and C respectively corresponding to the filter conditions A, B, and C.

After that, for example, when the power supply of the conditional access apparatus A is turned off and the conditional access apparatus A becomes unable to receive packets temporarily, each of the conditional access apparatuses B and C acquires the key information packet A while the power supply of the conditional access apparatus A is turned off.

Because the process of acquiring the key information packet A carried out by each of the conditional access apparatuses B and C is the same as that of above-mentioned Embodiment 1, the explanation of the process will be omitted hereafter.

When the power supply of the conditional access apparatus A is turned on and each of the conditional access apparatuses B and C becomes able to carry out communications with the conditional access apparatus A after each of the conditional access apparatuses B and C has acquired the key information packet A, each of the conditional access apparatuses B and C promptly transmits the key information packet A to the conditional access apparatus A.

As a result, even before the conditional access apparatus A receives the key information packet A which is periodically transmitted thereto from the broadcasting station after the conditional access apparatus A is powered on, the conditional access apparatus A can start decrypting media packets.

As can be seen from the above description, the conditional access apparatus A in accordance with this Embodiment 2 is configured in such a way as to, when receiving a filter condition B from the conditional access apparatus B, inform the filter condition B to the conditional access apparatus C, and, when receiving a filter condition C from the conditional access apparatus C, inform the filter condition C to the conditional access apparatus B. Therefore, there is provided an advantage of being able to improve the probability that each conditional access apparatus can acquire a key information packet destined for another conditional access apparatus on behalf of the other conditional access apparatus, as compared with above-mentioned Embodiment 1.

In this Embodiment 2, the external filter control unit 12 holds a filter condition transmitted from another conditional access apparatus, and the communication control unit 11 transmits the filter condition outputted from the external filter control unit 12 to another conditional access apparatus different from the other conditional access apparatus, as previously mentioned. As an alternative, the filter unit 1 can hold a filter condition transmitted from another conditional access apparatus, and the communication control unit 11 can transmit the filter condition outputted from the filter unit 1 to another conditional access apparatus different from the other conditional access apparatus.

Embodiment 3

Figure 4:
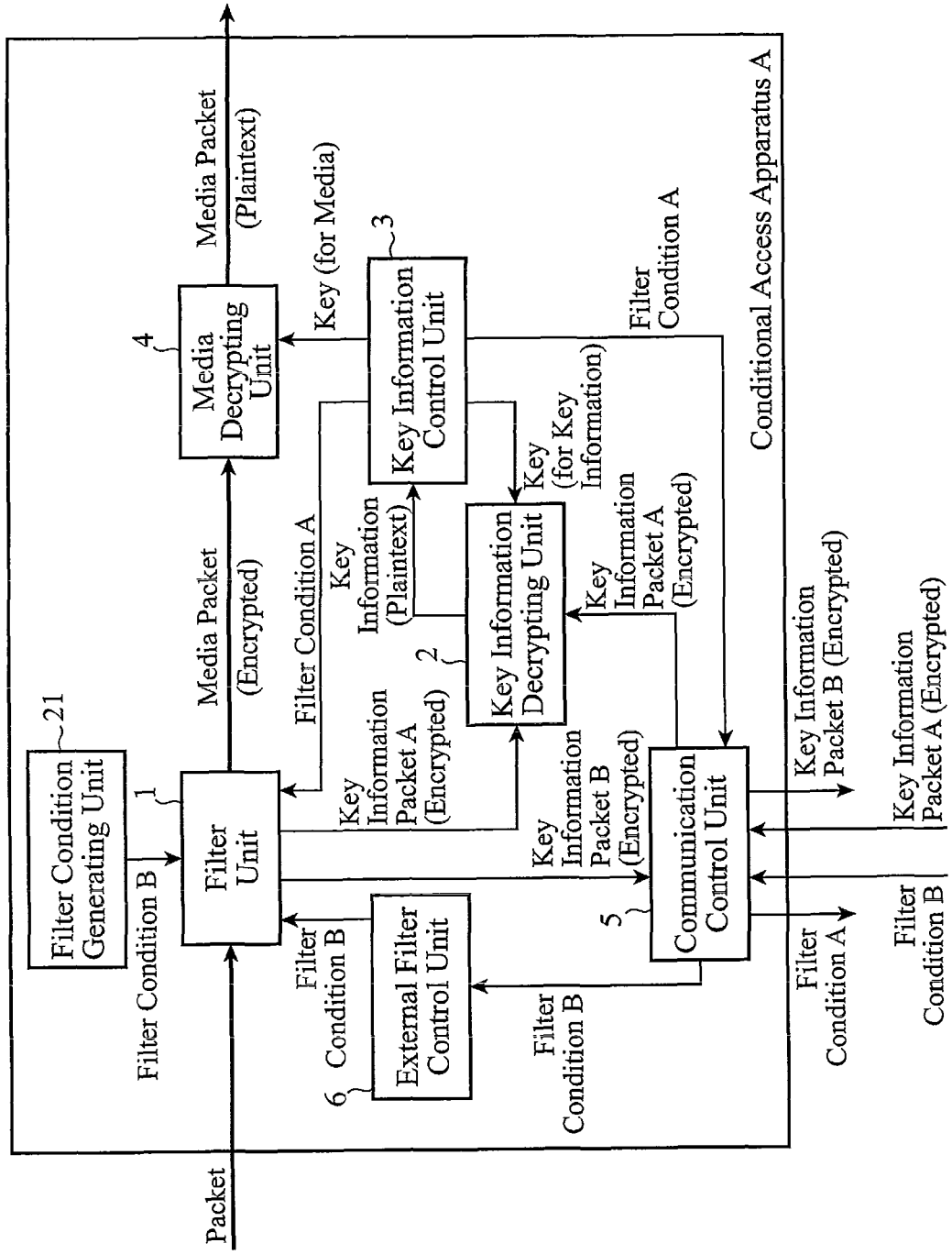
FIG. 4 is a block diagram showing a conditional access apparatus in accordance with Embodiment 3 of the present invention.

FIG. 4 is a block diagram showing a conditional access apparatus in accordance with Embodiment 3 of the present invention. In the figure, because the same reference numerals as those shown in FIG. 1 denote the same components or like components, the explanation of these components will be omitted hereafter.

A filter condition generating unit 21 of the conditional access apparatus A carries out a process of generating the same filter condition B as a filter condition B which the conditional access apparatus A receives from a conditional access apparatus B (another conditional access apparatus). The filter condition generating unit 21 forms a filter condition generating means.

Although FIG. 4 shows that the filter condition generating unit 21 is added to the conditional access apparatus of FIG. 1, the filter condition generating unit 21 can be alternatively added to the conditional access apparatus of FIG. 3.

Next, the operation of the conditional access apparatus will be explained.

In each of above-mentioned Embodiments 1 and 2, the embodiment in which, for example, the conditional access apparatus A receives a filter condition B from the conditional access apparatus B is shown. The filter condition generating unit 21 for generating the same filter condition B as the filter condition B is disposed, and the filter condition generating unit 21 can set the filter condition B to a filter unit 1.

For example, in a case in which a filter condition is a sequence of bytes having a predetermined length and is generated according to a fixed rule, if the conditional access apparatus A can acquire information meeting the rule, the conditional access apparatus A can generate the filter condition B without communicating with the other conditional access apparatus B.

Hereafter, an example of the generation of the filter condition B by the filter condition generating unit 21 will be explained.

For example, in a case in which an owner-specific ID or the like is assigned to a part of a filter condition, the same owner's filter condition can be covered by setting the remaining fields to wildcards.

Therefore, the filter condition generating unit 21 generates the filter condition B partially including an owner-specific ID registered into the conditional access apparatus A, and then sets the filter condition B to the filter unit 1. As a result, the conditional access apparatus becomes able to acquire the same owner's key information.

Furthermore, also in a case in which a specific number specific to each maker or each model of a maker is assigned to a part of a filter condition, the conditional access apparatus can generate the same maker's filter condition or the same model's filter condition and becomes able to acquire the same maker's key information or the same model's key information.

As an alternative, by generating a filter condition by using physical position information, a MAC address, or the like, the conditional access apparatus becomes able to acquire key information.

As can be seen from the above description, in accordance with this Embodiment 3, the filter condition generating unit 21 is configured in such a way as to generate the same filter condition B as a filter condition B which the conditional access apparatus receives from the conditional access apparatus B. Therefore, there is provided an advantage of being able to omit a communications process of receiving the filter condition B from the conditional access apparatus B.

In this Embodiment 3, the function of the communication control unit 5 receiving the filter condition B from the other conditional access apparatus B is left in the conditional access apparatus, though this function can be eliminated from the conditional access apparatus.

Furthermore, in this Embodiment 3, the filter condition generating unit 21 generates the filter condition B including one of various types of IDs in a part thereof. As an alternative, the filter condition generating unit can carry out a certain calculation on the basis of one of various types of IDs to generate the filter condition B partially including the calculation result.

Embodiment 4

Figure 5:
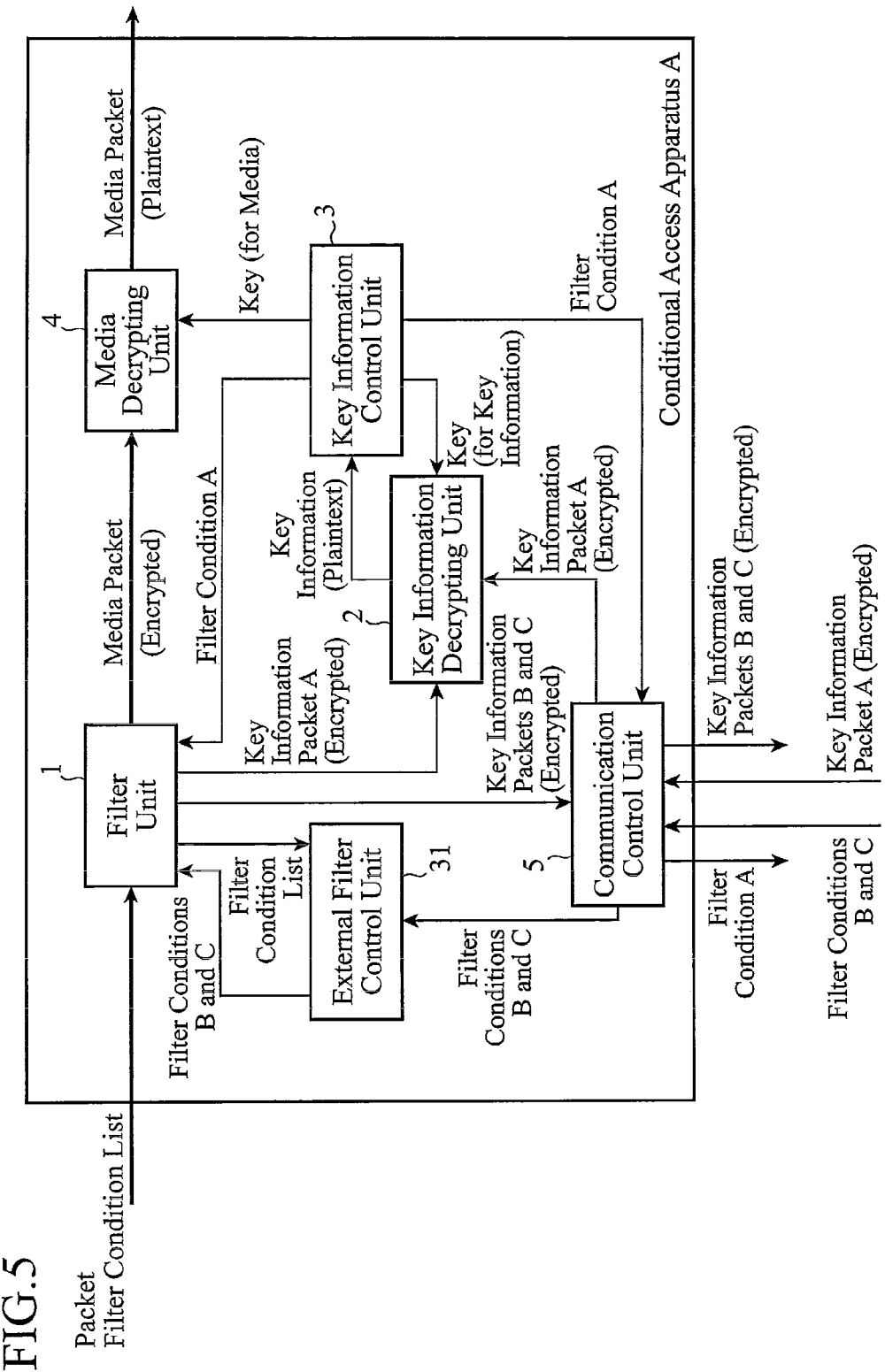
FIG. 5 is a block diagram showing a conditional access apparatus in accordance with Embodiment 4 of the present invention.

FIG. 5 is a block diagram showing a conditional access apparatus in accordance with Embodiment 4 of the present invention. In the figure, because the same reference numerals as those shown in FIG. 1 denote the same components or like components, the explanation of these components will be omitted hereafter.

When a filter unit 1 receives a filter condition list in which filter conditions B and C which are the same as filter conditions B and C received from conditional access apparatuses B and C are described, an external filter control unit 31 of a conditional access apparatus A carries out a process of extracting the filter conditions B and C from the filter condition list, and setting the filter conditions B and C to the filter unit 1. The external filter control unit 31 forms a key information informing means.

In the embodiment shown in FIG. 5, the external filter control unit 31 is applied to the conditional access apparatus of FIG. 1. As an alternative, the external filter control unit 31 can be applied to the conditional access apparatus of FIG. 3.

Figure 6:
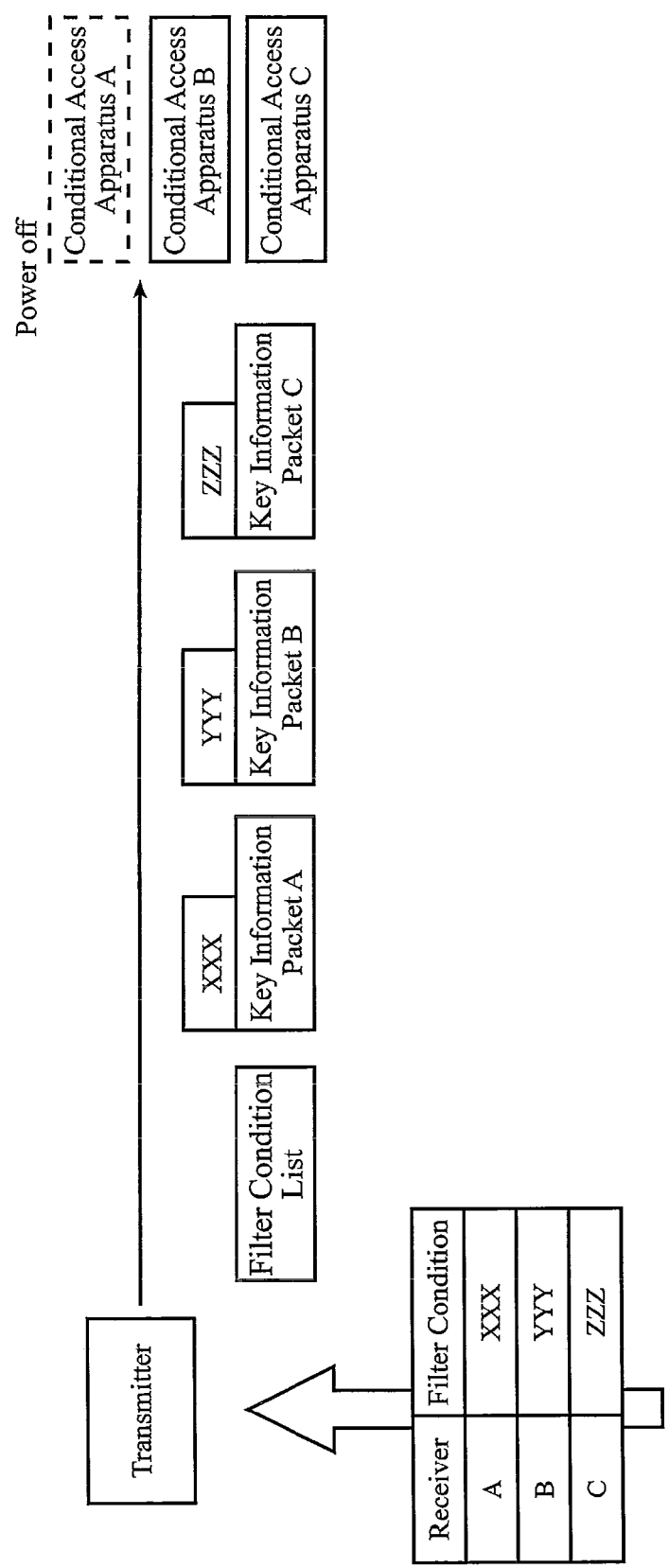
FIG. 6 is an explanatory drawing showing an example of transmission of a filter condition list.

FIG. 6 is an explanatory drawing showing an example of transmission of the filter condition list.

Next, the operation of the conditional access apparatus will be explained.

For example, a system administrator, a maker or the like which grasps the filter conditions of the conditional access apparatuses A, B, and C informs, as the filter conditions A, B, and C of the conditional access apparatuses A, B, and C, a filter condition list in which "XXX", "YYY", and "ZZZ" are described to a transmitter of a broadcasting station. When receiving the filter condition list, the transmitter of the broadcasting station multiplexes the filter condition list with a media packet or a key information packet, and then transmits the packet to the conditional access apparatuses A, B, and C, as shown in FIG. 6.

In this case, the transmitter of the broadcasting station receives the filter condition list from the system administrator, the maker, or the like, as previously mentioned. As an alternative, the transmitter of the broadcasting station can generate the filter condition list. It is assumed that a filter condition for acquiring the filter condition list in common is preset to the filter unit 1 of each of the conditional access apparatuses A, B, and C.

When receiving the packet transmitted from the transmitter of the broadcasting station, the filter unit 1 of each of the conditional access apparatuses A, B, and C acquires the filter condition list from the packet, and then outputs the filter condition list to the external filter control unit 31.

However, in the example of FIG. 6, the conditional access apparatus A has not been turned on yet, and therefore cannot acquire the filter condition list.

When receiving the filter condition list from the filter unit 1, the external filter control unit 31 of the conditional access apparatus B extracts the filter conditions A and C of the other conditional access apparatuses A and C from the filter condition list, and then sets the filter conditions A and C to the filter unit 1.

The key information control unit 3 of the conditional access apparatus B sets the filter condition B for the conditional access apparatus itself to the filter unit 1, like that of above-mentioned Embodiment 1.

As a result, the filter conditions A, B and C are set to the filter unit 1 of the conditional access apparatus B, and the conditional access apparatus B becomes able to acquire key information packets A, B and C respectively corresponding to the filter conditions A, B and C.

Furthermore, when receiving the filter condition list from the filter unit 1, the external filter control unit 31 of the conditional access apparatus C extracts the filter conditions A and B of the other conditional access apparatuses A and B from the filter condition list, and then sets the filter conditions A and B to the filter unit 1.

The key information control unit 3 of the conditional access apparatus C sets the filter condition C for the conditional access apparatus itself to the filter unit 1.

As a result, the filter conditions A, B and C are set to the filter unit 1 of the conditional access apparatus C, and the conditional access apparatus C becomes able to acquire key information packets A, B and C respectively corresponding to the filter conditions A, B and C.

Because the process of acquiring the key information packet A carried out by each of the conditional access apparatuses B and C is the same as that of above-mentioned Embodiment 1, the explanation of the process will be omitted hereafter. When the power supply of the conditional access apparatus A is turned on and each of the conditional access apparatuses B and C becomes able to carry out communications with the conditional access apparatus A after each of the conditional access apparatuses B and C has acquired the key information packet A, each of the conditional access apparatuses B and C promptly transmits the key information packet A to the conditional access apparatus A.

As a result, even before the key information packet A is transmitted from the broadcasting station, the conditional access apparatus A can start decrypting media packets.

As can be seen from the above description, the conditional access apparatus in accordance with this Embodiment 4 is configured in such a way as to, when the filter unit 1 receives a filter condition list, extract the filter conditions of other conditional access apparatuses from the filter condition list and then set the filter conditions to the filter unit 1. Therefore, there is provided an advantage of being able to omit a communications process of receiving a filter condition from another conditional access apparatus.

In this Embodiment 4, the function of the communication control unit 5 receiving a filter condition from another conditional access apparatus is left in the conditional access apparatus, though this function can be eliminated from the conditional access apparatus.

In this Embodiment 4, when the filter unit 1 receives a filter condition list, the external filter control unit 31 extracts the filter conditions of other conditional access apparatuses from the filter condition list, and sets the filter conditions to the filter unit 1, as previously mentioned. The present invention is not limited to this example, and a variant as will be shown below is provided.

For example, when the filter condition list received by the filter unit 1 is encrypted together with a key information packet, the key information decrypting unit 2 can decrypt the filter condition list, and, after that, the key information control unit 3 can set the filter conditions of other conditional access apparatuses included in the plaintext filter condition list to the filter unit 1.

Embodiment 5

In above-mentioned Embodiment 1, the conditional access apparatus A and the conditional access apparatus B exchange filter conditions and key information packets with each other, as previously mentioned. As an alternative, the conditional access apparatus A and the conditional access apparatus B can exchange filter conditions and key information packets by using external communication equipment.

Figure 7:
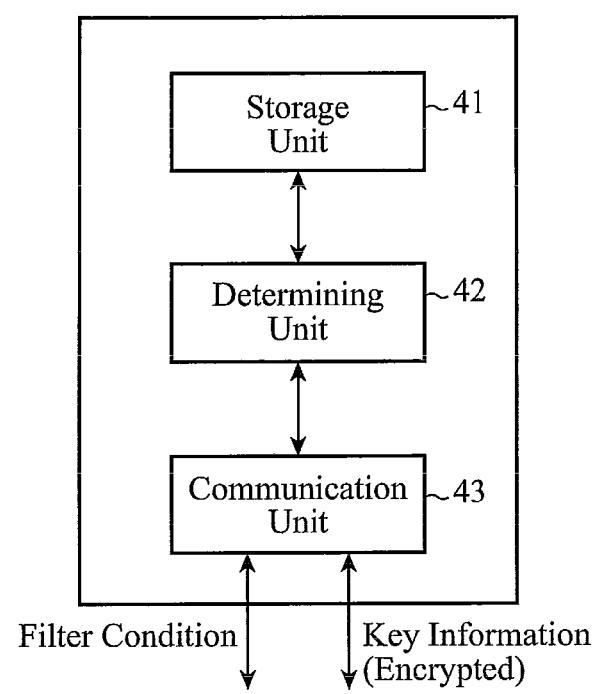
FIG. 7 is a block diagram showing communication equipment which a conditional access apparatus in accordance with Embodiment 5 of the present invention uses.

FIG. 7 is a block diagram showing communication equipment which a conditional access apparatus in accordance with Embodiment 5 of the present invention uses. In the figure, a storage unit 41 is a memory for temporarily storing a filter condition and a key information packet received by a communication unit 43.

A determining unit 42 carries out a process of determining whether or not to perform storing and communications on a filter condition and a key information packet.

The communication unit 43 transmits and receives a filter condition and a key information packet to and from a conditional access apparatus.

The communication equipment does not need to be equipment for exclusive use. For example, the functions of the communication equipment can be added to a mobile phone or the like. As an alternative, in a case in which a conditional access apparatus is mounted in a vehicle, the functions of the communication equipment can be added in advance to a remote control having a keyless entry function and a communication function, or the like.

Figure 8:
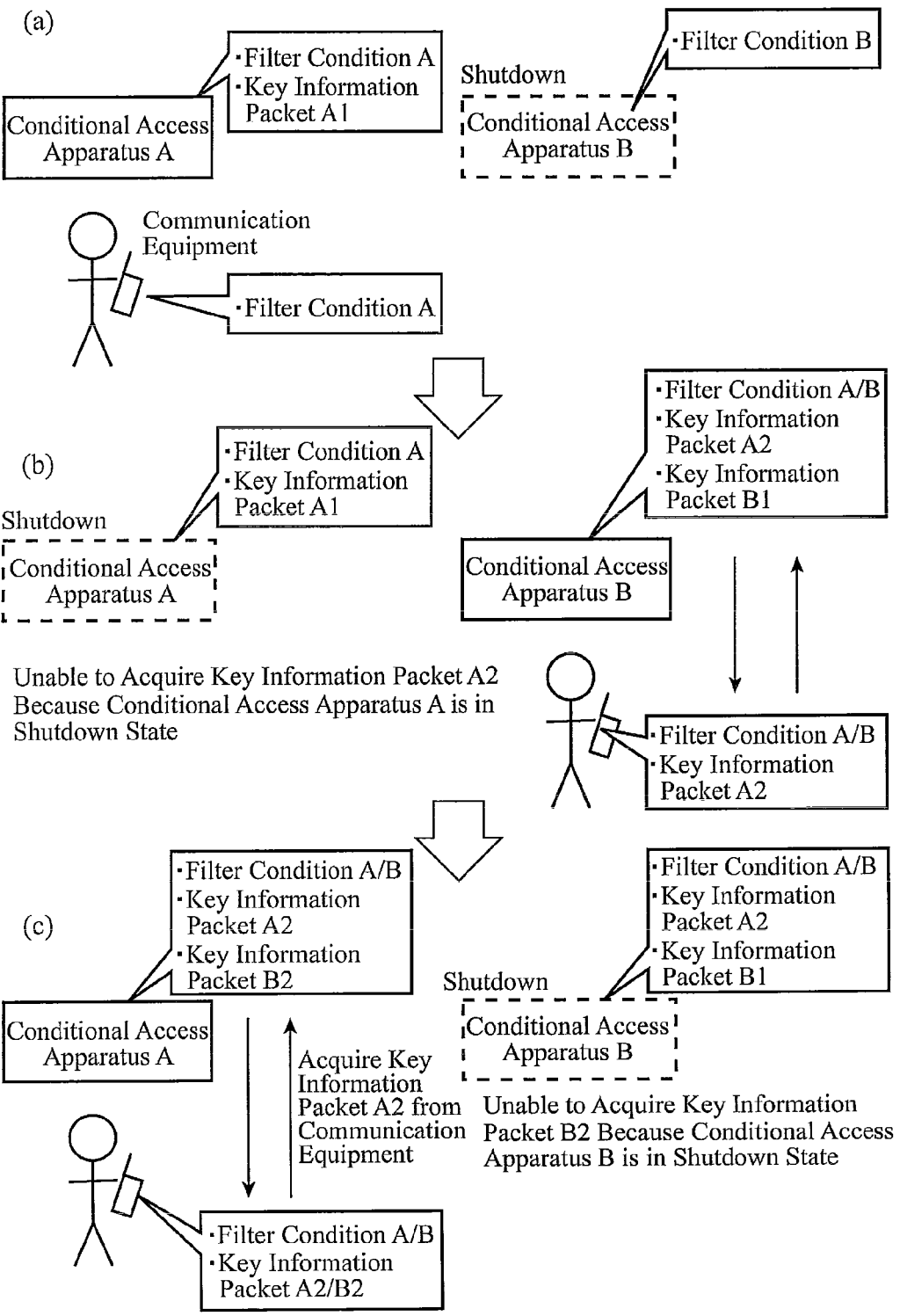
FIG. 8 is an explanatory drawing showing a state that a conditional access apparatus A and a conditional access apparatus B exchange filter conditions and key information packets with each other by using the communication equipment.
Figure 9:
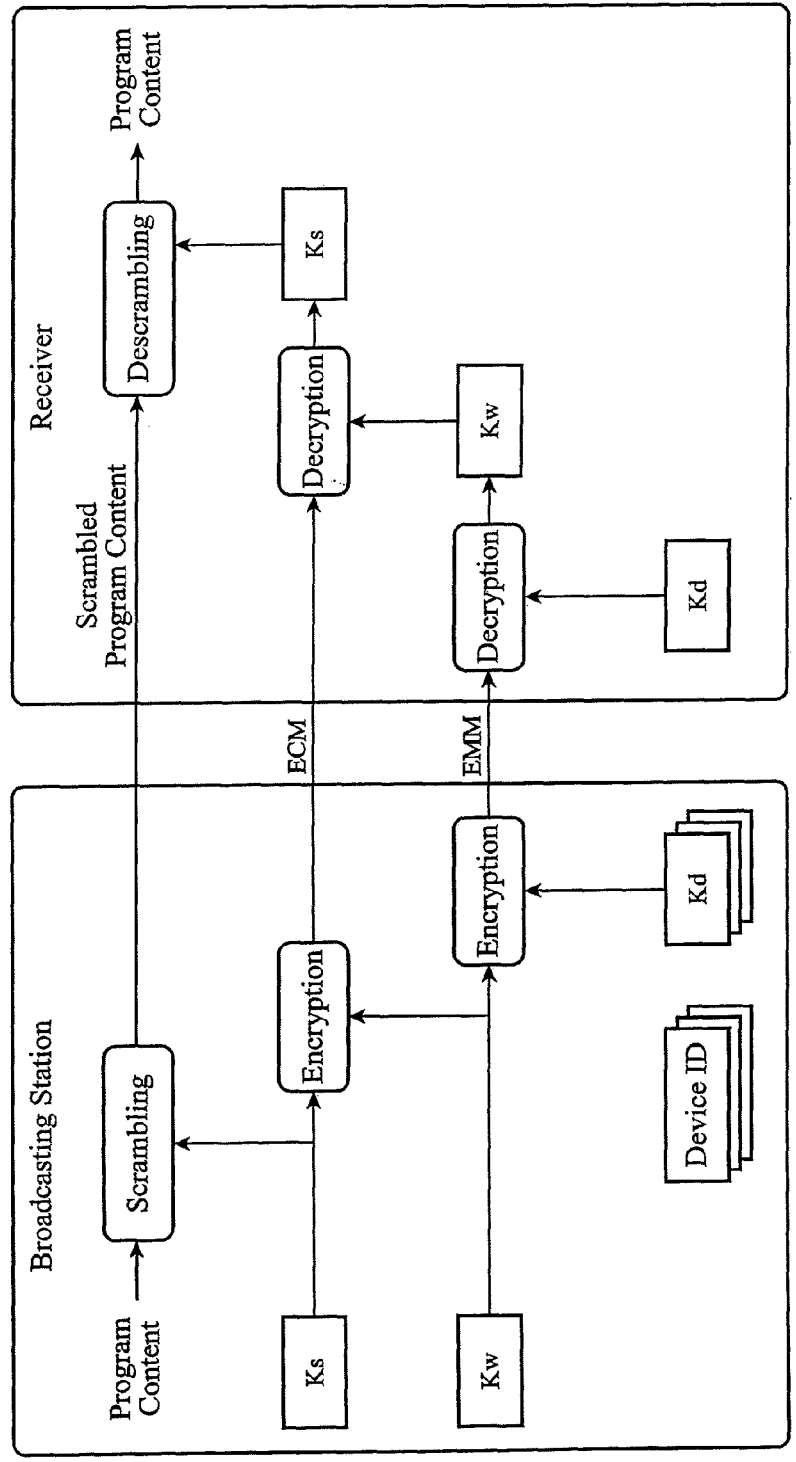
FIG. 9 is an explanatory drawing showing an exchange of information between a broadcasting station and a receiver which is defined in the technical specification "ARIB STD-B25".

FIG. 8 is an explanatory drawing showing a state that a conditional access apparatus A and a conditional access apparatus B exchange filter conditions and key information packets with each other by using the communication equipment.

In FIG. 8, FIGS. 8(*a*), 8(*b*), and 8(*c*) are arranged in chronological order, and a state in which a user having the communication equipment goes back and forth between the two conditional access apparatuses A and B is shown.

Each balloon shown in FIG. 8 shows information currently being held by either one of the conditional access apparatuses or the communication equipment.

Furthermore, key information A1 and key information A2 show that the key information for the conditional access apparatus A varies in chronological order, and each of the conditional access apparatuses always needs to acquire the newest (a larger subscript numerical value) key information.

Next, the operations of the conditional access apparatuses and the communication equipment will be explained.

As shown in FIG. 8(*a*), the user stays in front of the conditional access apparatus A with the communication equipment first.

At this time, the conditional access apparatus A is operating and the communication control unit 5 informs its filter condition A in the conditional access apparatus to the communication equipment.

When the communication unit 43 receives the filter condition A transmitted from the conditional access apparatus A, the determining unit 42 of the communication equipment checks whether or not the same filter condition as the filter condition A is stored in the storage unit 41, and, unless the same filter condition is stored in the storage unit, stores the filter condition A in the storage unit 41.

In FIG. 8(*a*), while the conditional access apparatus A acquires a key information packet A1 meeting the filter condition A, the conditional access apparatus B at a distant place from the conditional access apparatus A is in a shutdown state, and does not acquire a key information packet B1.

Next, in FIG. 8(*b*), after the user stops the conditional access apparatus A, he or she moves toward the front of the conditional access apparatus B with the communication equipment, and starts using the conditional access apparatus B.

At this time, the communication control unit 5 of the conditional access apparatus B informs its internal filter condition B in the conditional access apparatus to the communication equipment.

When the communication unit 43 receives the filter condition B transmitted from the conditional access apparatus B, the determining unit 42 of the communication equipment checks whether or not the same filter condition as the filter condition B is stored in the storage unit 41, and, unless the same filter condition is stored in the storage unit, stores the filter condition B in the storage unit 41.

Furthermore, because the filter condition A is stored in the storage unit 41, the determining unit 42 of the communication equipment transmits the filter condition A to the conditional access apparatus B via the communication unit 43.

As a result, when the communication control unit 5 of the conditional access apparatus B receives the filter condition A, the conditional access apparatus B sets the filter condition A to the filter unit 1, like that of above-mentioned Embodiment 1.

In FIG. 8(b), the conditional access apparatus B acquires both a key information packets A2 meeting the filter condition A and a key information packets B1 meeting the filter condition B.

At this time, the conditional access apparatus A which is in the shutdown state cannot acquire the key information packet A2.

Furthermore, because the filter condition A is stored in the storage unit 41, the determining unit 42 of the communication equipment acquires the key information packet A2 meeting the filter condition A via the communication unit 43, and stores the key information packet A2 in the storage unit 41.

Next, in FIG. 8(c), after stopping the conditional access apparatus B, the user moves toward the front of the conditional access apparatus A again with the communication equipment, and then starts using the conditional access apparatus A.

After having checked that the key information packet A2 stored in the storage unit 41 is newer than the key information packet A1 acquired by the conditional access apparatus A in FIG. 8 (a), the determining unit 42 of communication equipment promptly transmits the key information packet A2 to the conditional access apparatus A via the communication unit 43.

As a result, regardless of the cycle of the transmission of the key information packet A2, the communication control unit 5 of the conditional access apparatus A can promptly acquire the newest key information packet A2.

Furthermore, because the filter condition B is stored in the storage unit 41, the determining unit 42 of the communication equipment acquires a key information packet B2 meeting the filter condition B via the communication unit 43, and stores the key information packet B2 in the storage unit 41.

In FIG. 8(c), because the conditional access apparatus B is in a shutdown state, the communication equipment transmits the newest key information packets B2 to the conditional access apparatus B when use of the conditional access apparatus B is started.

As can be seen from the above description, in accordance with this Embodiment 5, the conditional access apparatuses A and B are configured in such a way as to exchange filter conditions and key information packets by using the external communication equipment. Therefore, there is provided an advantage of being able to transmit and receive filter conditions and key information packets indirectly between the conditional access apparatuses A and B even if the conditional access apparatuses A and B are located at positions physically separated from each other.

In this Embodiment 5, in FIG. 8(a), the conditional access apparatus A handles the filter condition A held thereby as something specific thereto, and does not inform the key information packet A1 to the communication equipment. As an alternative, the conditional access apparatus A can inform the key information packet A1 to the communication equipment in a case in which many similar conditional access apparatuses A exist.

The same goes for whether or not the conditional access apparatus B informs the key information packet B2 to the communication equipment in FIG. 8(b).

The communication equipment can have a filtering function of filtering media packets or key information packets, like the conditional access apparatus.

In the example of FIG. 8, the case in which the power supply is turned off is shown as the state in which each of the conditional access apparatuses cannot receive a key information packet, though there can be a case in which each of the conditional access apparatuses cannot receive a key information packet due to deterioration in the reception state, or the like even when, for example, each of the conditional access apparatuses is powered on.

INDUSTRIAL APPLICABILITY

As mentioned above, the conditional access apparatus in accordance with the present invention is suitable for use as the one which, when receiving encrypted media data, needs to decode the encryption of the media data in real time.

The invention claimed is:

1. A conditional access apparatus capable of decrypting a first encrypted key information that meets a first predetermined filter condition, but incapable of decrypting a second encrypted key information that meets a second predetermined filter condition, said conditional access apparatus comprising:

a hardware processor-based filtering unit for:
 receiving encrypted media data to output said media data,
 receiving encrypted key information,
 determining whether said received key information meets the first or the second predetermined filter condition, and
 when said received key information meets the first or the second predetermined filter condition, outputting said received key information;

a hardware processor-based key information decrypting unit for:
 setting said first predetermined filter condition to said filtering unit, and
 decrypting the key information outputted from said filtering unit when the outputted key information is the first encrypted key information that meets the first predetermined filter condition, a hardware processor-based media data decrypting unit for decrypting the media data outputted from said filter unit by using the key information decrypted by said key information decrypting unit; and a hardware processor-based key information informing unit for:
 receiving the second predetermined filter condition from another conditional access apparatus to set said received second predetermined filter condition to said filtering unit, and
 when the outputted key information is the second encrypted key information that meets said second predetermined filter condition and is thus outputted from said filtering unit, sending the outputted key information to the other conditional access apparatus.

2. A conditional access apparatus capable of decrypting a first encrypted key information that meets a first predetermined filter condition, but incapable of decrypting a second encrypted key information that meets a second predetermined filter condition, said conditional access apparatus comprising:
- a hardware processor-based filtering unit for:
  - receiving encrypted media data to output said media data,
  - receiving encrypted key information,
  - determining whether said received key information meets the first or the second predetermined filter condition, and
  - when said received key information meets the first or the second predetermined filter condition, outputting said received key information;
- a hardware processor-based key information decrypting unit for:
  - setting said first predetermined filter condition to said filtering unit, and
  - decrypting the key information outputted from said filtering unit when the outputted key information is the first encrypted key information that meets the first predetermined filter condition,
- a hardware processor-based media data decrypting unit for decrypting the media data outputted from said filtering unit by using the key information decrypted by said key information decrypting unit; and
- a hardware processor-based key information acquiring unit for:
  - sending the first predetermined filter condition set to said filtering unit by said key information decrypting unit to another conditional access apparatus which is capable of decrypting the second encrypted key information but incapable of decrypting the first encrypted key information, and
  - acquiring the first key information meeting said first predetermined filter condition from the other conditional access apparatus in response to the other conditional access apparatus determining that key information received therein meets the first predetermined filter condition.

3. A conditional access apparatus capable of decrypting a first encrypted key information that meets a first predetermined filter condition, but incapable of decrypting a second encrypted key information that meets a second predetermined filter condition, said conditional access apparatus comprising:
- a hardware processor-based filtering unit for:
  - receiving encrypted media data to output said media data,
  - receiving encrypted key information,
  - determining whether said received key information meets the first or the second predetermined filter condition, and
  - when said received key information meets the first or the second predetermined filter condition, outputting said received key information;
- a hardware processor-based key information decrypting unit for:
  - setting said first predetermined filter condition to said filtering unit, and
  - decrypting the key information outputted from said filtering unit when the outputted key information is the first encrypted key information that meets the first predetermined filter condition,
- a hardware processor-based media data decrypting unit for decrypting the media data outputted from said filtering unit by using the key information decrypted by said key information decrypting unit;
- a hardware processor-based key information informing unit for:
  - receiving the second predetermined filter condition from another conditional access apparatus to set said received second predetermined filter condition to said filtering unit, and
  - when the outputted key information is the second encrypted key information that meets said second predetermined filter condition and is thus outputted from said filtering unit, sending the outputted key information to the other conditional access apparatus; and
- a hardware processor-based key information acquiring unit for:
  - sending the first predetermined filter condition set to said filtering unit by said key information decrypting unit to the other conditional access apparatus, and
  - acquiring the first key information meeting said first predetermined filter condition from the other conditional access apparatus in response to the other conditional access apparatus determining that key information received therein meets the first predetermined filter condition,
- wherein the other conditional access apparatus is capable of decrypting the second encrypted key information but incapable of decrypting the first encrypted key information.

4. The conditional access apparatus according to claim 3, wherein when receiving a filter condition from the other conditional access apparatus, the key information informing unit sends said received filter condition to another conditional access apparatus different from the other conditional access apparatus.

5. The conditional access apparatus according to claim 3, wherein said conditional access apparatus comprises a filter condition generating unit for generating a filter condition which is same as the filter condition which said conditional access apparatus receives from the other conditional access apparatus.

6. The conditional access apparatus according to claim 3, wherein when receiving a filter condition list in which a filter condition which matches the filter condition which the filtering unit receives from the other conditional access apparatus is described, the key information informing unit extracts said matching filter condition from said filter condition list to set said matching filter condition to the filtering unit.

7. The conditional access apparatus according to claim 3, wherein the conditional access apparatus transmits and receives a filter condition and key information to and from the other conditional access apparatus by using external communication equipment.

* * * * *